Dec. 12, 1967  F. H. SCHNEIDER  3,357,106
LEVELING ROD DEVICE
Filed July 18, 1967
2 Sheets-Sheet 1
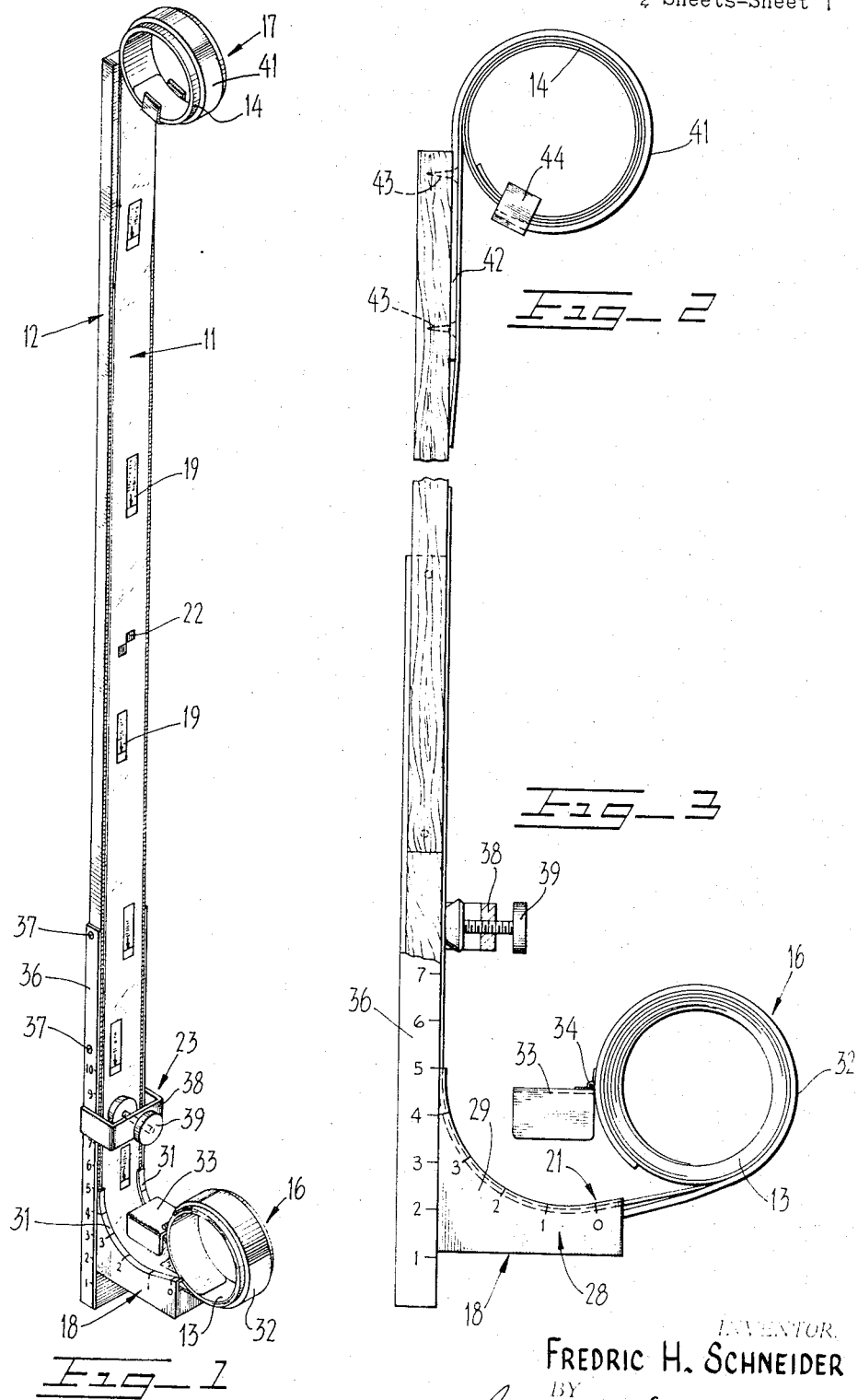
INVENTOR.
FREDRIC H. SCHNEIDER
BY
Gardner & Zimmerman
ATTORNEYS Dec. 12, 1967  F. H. SCHNEIDER  3,357,106
LEVELING ROD DEVICE
Filed July 18, 1967  2 Sheets-Sheet 2
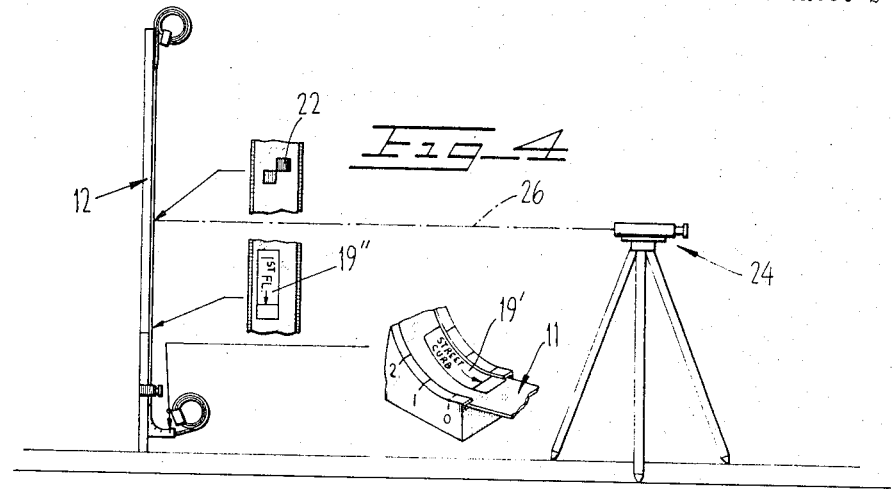
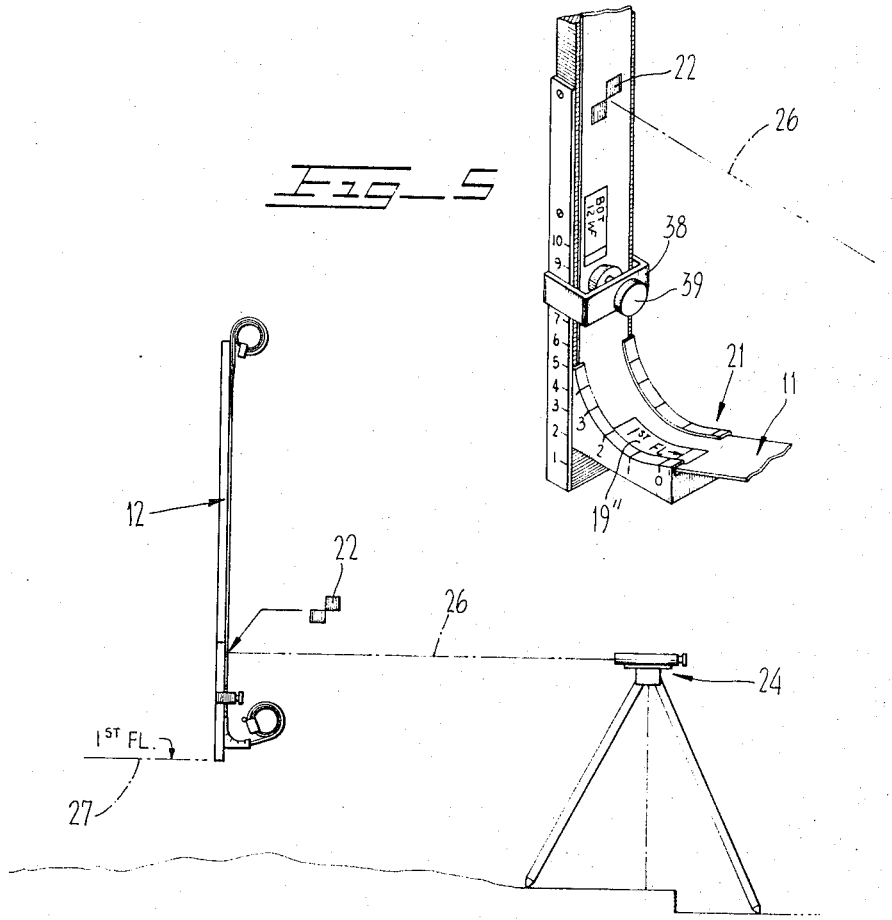
INVENTOR.
FREDRIC H. SCHNEIDER
BY
Gardner + Zimmerman
ATTORNEYS

United States Patent Office 3,357,106
Patented Dec. 12, 1967

3,357,106
LEVELING ROD DEVICE
Fredric H. Schneider, 4521 Merrill Ave.,
Oakland, Calif. 94619
Filed Jan. 18, 1967, Ser. No. 610,107
10 Claims. (Cl. 33—74)

ABSTRACT OF THE DISCLOSURE

An arrangement for facilitating the laying off of measured distances from a predetermined horizontal reference plane to establish elevations in a building, excavation, or the like. An arrangement is described which enables the elevations of various building elements relative to a horizontal reference plane to be ascertained with the aid of a surveyor's level, or equivalent level indicating instrument for establishing the reference plane.

Background of the invention

The present invention relates generally to the laying off of measured distances from a starting or reference point, and is particularly concerned with the determination of elevations or levels in the construction of buildings and excavations.

In various larger building and excavation operations, for example, it is the usual practice to establish various construction levels relative to a starting or reference point with the aid of a surveyor's level and a suitable measuring element such as a leveling rod or template stick. The level is used to establish horizontal reference planes from which desired upright distances may be measured by means of the measuring element to establish the elevations of building an excavation elements indicated on the construction plan. When a conventional leveling rod is used to make the measurements, an addition or subtraction of readings is involved in each elevation determination relative to a reference plane established by the level. There is thus an attendant substantial consumption of time or chance of error. Moreover, in the use of a levelling rod for measuring, it is usually necessary to frequently reestablish a given reference plane. Since it is difficult to successively set up a level with its plane of leveling the same, construction workers often consider a template stick to be more expedient in accomplishing elevation measurements. In this regard, the stick is directly marked along its length with points of reference for use of the stick in plumbed position as a height template for a building element to be disposed above a reference point at a known level. However, a different template stick is required for each set of measurements, e.g., the height of a doorway header or an overlying floor level above a given reference level, such as the ground, foundation, lower floor, etc. Aside from the disadvantage in the number required, the practical length of a template stick is necessarily limited.

Summary of the invention

The present invention provides an improved leveling rod or template device featuring a template strip which is translatable along the length of the device between coils of the strip formed and held at the opposite ends of the device. A plurality of measurement marker elements identified as various building or construction element levels, such as curb level, foundation level, floor levels, etc., are removably provided at measured distances along the strip corresponding to relative measurements derived from elevations specified on a given building or construction plan. A fixed index point is provided adjacent the lower coil of the template strip at a position which is so calibrated that the lower end of the device represents the level of a marker element positioned adjacent the index point. In addition, a target marker element is placed on the strip at a position corresponding to the line-of sight of a surveyor's level, or equivalent leveling instrument, supported at a level corresponding to that represented by a marker disposed adjacent the index point. For example, the strip may be translated to position the marker element representing curb level adjacent the index point, and the device held in plumb position with its lower end engaging the curb surface. With the leveling instrument supported on the curb surface, a sight is taken on the device and the target marker element is placed on the strip at line-of-sight position. Now, when the strip is translated to position a marker element representative of the level of a different building element (e.g., first floor level) adjacent the index point, and a sight is taken on the target marker element, the lower end of the device indicates the proper elevation of such building element. Other elevation indications may be similarly derived. In addition, once an elevation is established, elevations of building elements represented by other marker elements on the strip are directly indicated by the levels of such marker elements.

It is particularly important to note that the device of the present invention is advantageous over conventional leveling rods in that no calculations are involved on the part of the construction worker in establishing the elevations of the various building elements. This accrues from the marker elements being prepositioned in proper relation on the strip by the architect, construction foreman, or the like. As a further advantage, a number of elevations may be derived without reestablishing a reference plane with a leveling instrument by using the device in the manner of a template stick. Moreover, unlike a conventional template stick, a single device provides all template indications required for an entire construction operation since the translatable coiled strip is, in effect, a full scale template.

According to another salient aspect of the invention, a preferred arrangement of template strip and furling means in unique cooperation facilitates translation and coiling of the strip with the utmost of constructional simplicity.

Brief description of the drawings

FIGURE 1 is a perspective view of a preferred embodiment of a level rod device in accordance with the present invention.

FIGURE 2 is a side elevational view of the upper portion of the device.

FIGURE 3 is a side elevational view of the lower portion of the device.

FIGURE 4 is a side elevational view of the device with fragmentary portions shown in front elevation, illustrating the manner in which the device is calibrated relative to a horizontal reference plane with the aid of a surveyor's level.

FIGURE 5 is a fragmentary perspective view of the device, illustrating the manner in which same is employed to indicate a predetermined elevation relative to the reference level.

FIGURE 6 is a side elevational view of the device in conjunction with the surveyor's level further illustrating the procedure depicted in FIGURE 5.

Description of the preferred embodiment

Referring now to the drawings, FIGURES 1–3 in particular, a leveling rod device in accordance with the present invention will be seen to basically include an elongated template strip 11 which is translatably carried on and along an elongated rigid backing member 12. The excess end portions of the strip beyond the opposite ends of the backing member are furled and maintained in coils 13, 14 by means of furling elements 16, 17 secured adjacent the ends of the backing member. The lower furling element 16 includes an arcuate guide portion 18 which has one end longitudinally aligned with the backing member and the other end projecting transversely outward therefrom at a position spaced slightly upward from the lower end of the backing member. A plurality of elevation measurement marker elements 19 of gummed paper, or the like, are removably secured to the front face of the template strip at predetermined spaced positions derived from a building plan, or the like. In this regard, the marker elements correspond to the various building elements set forth on the plan, e.g., foundation, floors, door jambs, etc., and are so labelled. The elements are placed on the strip by an architect, building foreman, or the like, at measured positions corresponding to the elevation dimensions set forth on the plan. The marked strip thus constitutes a full scale elevation template of the entire building depicted by the plan. By virtue of the opposite end portions of the strip being maintained in coils 13, 14, the strip may be as long as needed while the required overall length of the backing member 12 is limited to that required to display a desired array of marker elements between the ends of the backing member. Thus, the backing member need only be slightly longer than the distance between successive floors, yet the length of the template strip may, for example, correspond to the height of a three story building.

The leveling rod device further includes an index point 21 provided on the guide portion 18 of the lower furling element 16. The point 21 is spaced along the guide portion from the face of the backing member 12 by an arcuate distance equal to the distance between the intersection of the guide portion with the backing member, and the lower end of the backing member. The guide portion is appropriately arranged to hold the strip 11 in fixed curved position such that the distance along the strip between the backing member and index point is maintained closely equal to the distance to the lower end of the backing member. Thus, the index point provides an accurate calibration of the strip whereby the lower end of the backing element represents the level of a marker element positioned adjacent the index point.

To complete the general arrangement of the leveling rod device, a target marker element 22 is removably secured to the face of the template strip 11 at a position determined in a manner subsequently described. In addition, selective clamping means 23 are carried by the backing member to prevent translation of the strip 11 once it has been appropriately positioned.

Considering now the manner in which the leveling rod device generally outlined hereinbefore is used, reference is made to FIGURES 4–6. In order to position the target marker element 22 on the strip 11, a desired reference elevation, e.g., curb level, is first selected. The strip is translated to position the measurement marker element 19′ representative of the selected reference elevation, i.e.. curb level, adjacent the index point 21. The backing element is held in plumb position with its lower end engaging the curb surface, and a sight is taken with a surveyor's level 24, or the like, also supported on the curb surface. The target marker element 22 is secured to the face of the strip at its point of intersection with the line-of-sight 26 of the level 24. The leveling rod device is thus calibrated for the determination of other elevations relative to the reference elevation. Now, when it is desired to establish the elevation of a building element, e.g., the first floor, the strip is translated to position the corresponding marker element 19″ adjacent the index point 21, as depicted in FIGURE 5. The leveling rod device is then held in plumb position, and a sight is taken on the target marker element 22 with the surveyor's level supported on the curb. The lower end of the backing member thus indicates the elevation of the selected building element, as indicated at 27. Moreover, with a selected measurement element adjacent the index point 21, and the lower end of the backing member supported at the elevation of the corresponding building element, the device may be used in the manner of a template stick, the other measurement marker elements depicting the elevations of corresponding building elements.

In the preferred construction of the leveling rod device, the lower and upper furling elements 16, 17 are preferably separately provided and adapted for removable securance to the backing member 12, which may then be provided as a board cut to a desired length by a construction worker on the job. The guide portion 18 of the lower furling element then advantageously comprises a rectangular block 28 having an arcuate backing face 29 cut therefrom to extend substantially 90°. The opposite sides of the face 29 are provided with inwardly extending flanges 31 to define edge guide grooves for the strip between the flanges and the face. The flanges serve to maintain the strip in fixed curved position for the reasons previously described. Alternatively, a transparent covered channel could be provided in bridging relation to the face 29 to maintain the strip in curved position. A rigid furling bracket 32 in the form of an open spiral extends outwardly and arcuately reentrantly rearward from the outer end of the backing face 29. A channel shaped keeper member 33 is advantageously provided in hinged connection with the bracket 32, as indicated at 34, to prevent the coil 13 of the strip 11 from being laterally displaced therefrom. The block 28 is secured in bridging relation to a pair of side straps 36 adapted to engage the opposite sides of the backing member 12 adjacent its lower end. Screws 37 extending through the side straps into threaded engagement with the backing member may thus be employed to facilitate removable securance of the furling element 16 thereto. The clamping means 23 is advantageously associated with the furling element 16, and in this regard such means preferably includes a channel 38 secured to the side straps 36 in bridging relation thereto. A thumb screw 39 extends through the web of the channel in threaded relation and is engageable with the strip 11 to selectively clamp same in position.

The upper furling element 17 is preferably provided as a rigid furling bracket 41 in the form of an open spiral with an elongated shank 42 extending tangentially therefrom. The shank 42 is adapted for removable securance to the backing member 12 in longitudinal alignment therewith, as by means of screws 43 extending through the shank and threadably engaging the backing member. The bracket further includes parallel spaced side tabs 44 projecting radially from the arcuate portion of the bracket 41 to prevent lateral displacement of the coil 14 of the strip 11 from the bracket.

To facilitate the use of furling elements 16, 17 for the relatively simple construction hereinbefore described, the template strip 11 is advantageously of flexible spring material so as to cooperate with the simple brackets 32, 41 in the formation and retention of the coils 13, 14. More particularly, by virtue of the resiliency of the spring material of the strip 11, the strip tends to force itself outwardly against the inner faces of the spiral brackets and thereby form the coils 13, 14. The strip may be readily translated by placing the hand against the inner convolution of one of the coils 13, 14 and rotating same. An end of the strip may of course be pre-coiled and placed in the bracket 32 when the keeper 33 is pivoted to an unobstructing position. Thereafter the keeper may be pivoted to active position to retain the coil in the bracket.

What is claimed is:
1. A leveling rod device comprising an elongated backing member, a template strip translatably carried on and along said backing member, means at the opposite ends of said backing member for furling the opposite ends of said strip and maintaining same in coils, a plurality of measurement marker elements removably secured to the exposed face of said strip at predetermined spaced-apart positions, an index point carried on a first of the furling means at a position displaced from said backing member by a distance equal that between said first furling means and the corresponding end of said backing member, and a target marker element carried on the face of said strip at a predetermined position.

2. A device according to claim 1, further defined by selective clamping means carried by said backing member for selectively preventing translation of said strip therealong.

3. A device according to claim 1, further defined by the furling means being removably secured to said backing member.

4. A device according to claim 1, further defined by said furling means each comprising a rigid open spiral bracket having an end extending outward from said backing member, and said strip being of flexible spring material.

5. A device according to claim 1, further defined by said first furling means including an arcuate guide bracket having one end longitudinally aligned with said backing member at a position spaced from the corresponding end thereof and a second end projecting transversely outward from said backing member at a position spaced from the corresponding end thereof and a second end projecting transversely outward from said backing member, said guide bracket having means retaining said strip in fixed curved position, said index point being on the second end of said bracket at a position displaced from the first end thereof by an arcuate distance equal to the distance between said first end of said bracket and said corresponding end of said backing member.

6. A device according to claim 5, further defined by said first furling means including a rigid open spiral bracket extending outwardly and reentrantly rearward from said second end of said guide bracket, said second furling means including a second rigid open spiral bracket extending longitudinally outward and reentrantly rearward from the second end of said backing member, said strip being of flexible spring material.

7. A device according to claim 5, further defined by said guide bracket being a rectangular block having an arcuate backing face cut therefrom to extend substantially 90° between said first and second ends of said guide bracket, said block having inwardly extending flanges at the opposite sides thereof defining edge guide grooves between the flanges and said backing face.

8. A device according to claim 6, further defined by a channel shaped keeper hingedly secured to said first spiral bracket, said keeper pivotally moveable between positions respectively obstructing and unobstructing the sides of said first spiral bracket, and parallel spaced side tabs projecting radially from the arcuate portion of said second spiral bracket.

9. A device according to claim 7, further defined by parallel spaced side straps secured to opposite sides of said block, said straps engaging opposite sides of said backing member and removably secured thereto, a first rigid open spiral bracket extending outwardly and reentrantly rearward from said arcuate backing face, and a second rigid open spiral bracket having an elongated shank extending tangentially therefrom, said shank removably secured to the second end of said backing member in longitudinal alignment therewith, said strip being of flexible spring material.

10. A device according to claim 9, further defined by a channel element secured in bridging relation to said side straps, and a thumb screw extending through the web of said channel element in threaded relation thereto for selective engagement with said strip.

No references cited.

HARRY N. HAROIAN, *Primary Examiner.*